United States Patent
Abt

[15] 3,668,105
[45] June 6, 1972

[54] QUICK-CHANGE HOLDER FOR ECM TOOLS

[72] Inventor: Ronald C. Abt, Cincinnati, Ohio
[73] Assignee: Cincinnati Milacron Inc., Cincinnati, Ohio
[22] Filed: Mar. 12, 1971
[21] Appl. No.: 123,564

Related U.S. Application Data

[62] Division of Ser. No. 785,226, Dec. 19, 1968, Pat. No. 3,594,298.

[52] U.S. Cl. .................. 204/297 R, 204/143 M, 204/224, 219/69 E, 279/41
[51] Int. Cl. .............. B23p 1/00, C23b 5/70, B23r 9/16
[58] Field of Search .............. 204/224, 143 M, 297 R, 284, 204/286; 279/41, 44; 219/69 E, 69 M

[56] References Cited

UNITED STATES PATENTS

| | | | |
|---|---|---|---|
| 3,594,298 | 7/1971 | Abt | 204/297 R |
| 3,444,070 | 5/1969 | Williams | 204/224 |
| 3,281,170 | 10/1966 | Kaplan | 279/41 |
| 2,998,258 | 8/1961 | Ambrose | 279/41 |
| 1,057,605 | 4/1913 | Windsor et al | 279/41 |

FOREIGN PATENTS OR APPLICATIONS

| | | | |
|---|---|---|---|
| 38/3809 | 4/1963 | Japan | 204/143 M |
| 222,100 | 10/1968 | U.S.S.R. | 204/143 M |

*Primary Examiner*—John H. Mack
*Assistant Examiner*—Regan J. Fay
*Attorney*—Howard T. Keiser and Jack J. Earl

[57] ABSTRACT

A cavity is provided in the platen of an ECM machine for receiving the mounting portion of the electrode tool. Part of the cavity takes the form of an arm extending around the tool for clamping it in the cavity. The tool is thereby held accurately in place on the platen and a large area of contact is provided between the tool and the platen for efficiently conducting the heavy machining current which flows therethrough during machining operations. Means is also provided for effecting a fluid-tight seal between the machining fluid passages in the tool and the corresponding passages in the platen when the tool is inserted in the cavity. This prevents machining fluid from entering the interface between the tool and the cavity and corroding the joint through which the machining current must flow.

4 Claims, 4 Drawing Figures

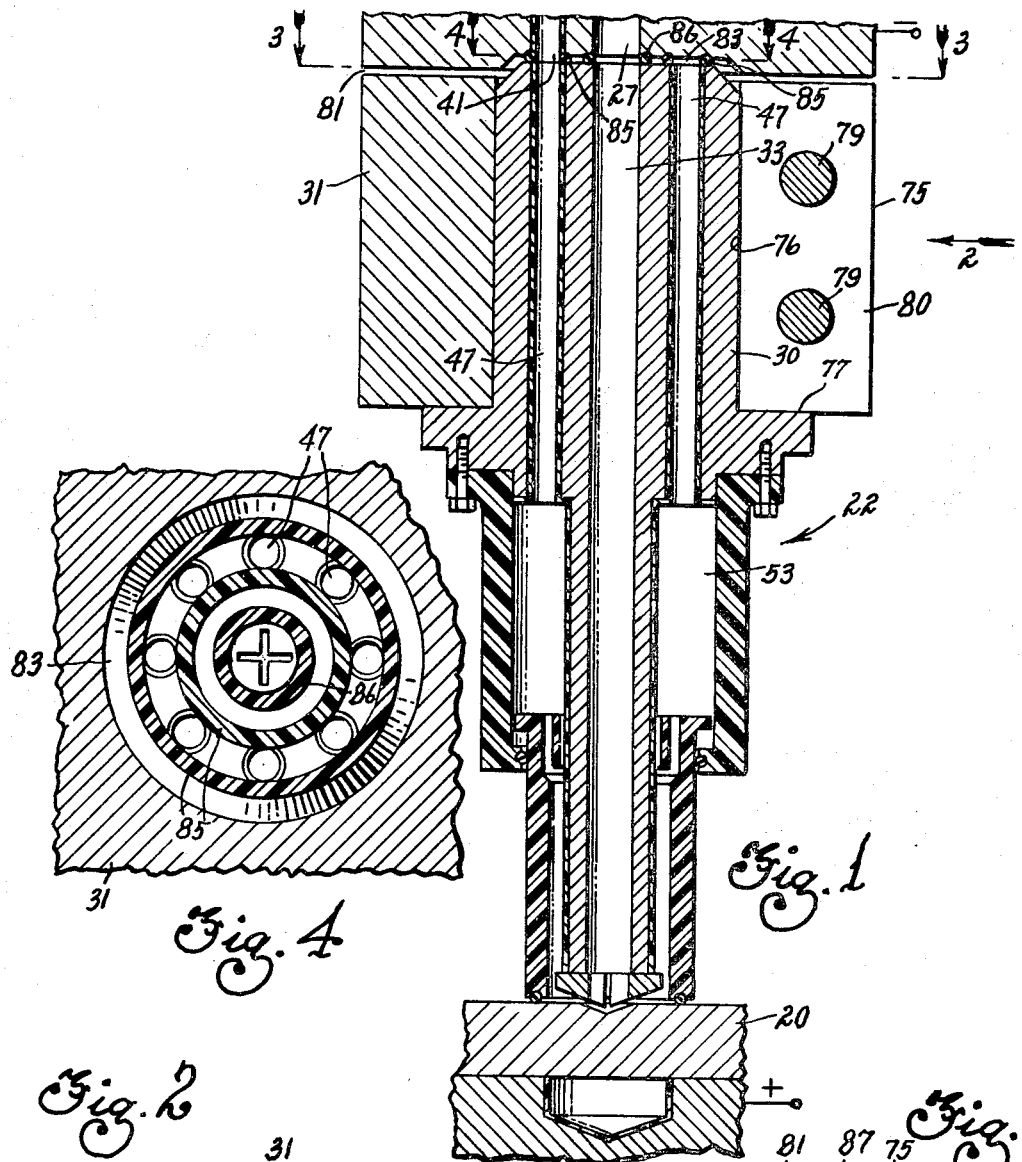
Fig. 1
Fig. 4
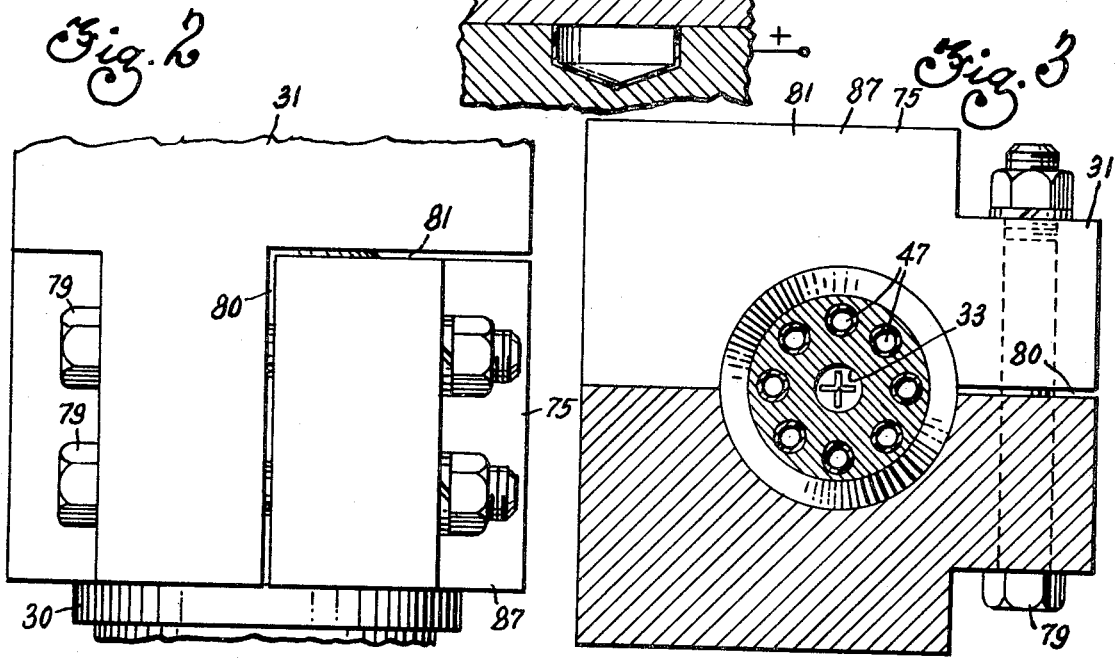
Fig. 2
Fig. 3

QUICK-CHANGE HOLDER FOR ECM TOOLS

This application is a division of my co-pending patent application Ser. No. 785,226 filed Dec. 19, 1968 for Portable Manifold for Electro-Erosive Machines, now U.S. Pat. No. 3,594,298.

BACKGROUND OF THE INVENTION

This invention belongs in the field of electro-erosive machines, more commonly known as electro-chemical (ECM) and electrical discharge (EDM) machines.

In both types of machines, it is important to mount the tool in the machine in such a manner as to provide good electrical contact between the tool and its supporting structure in the machine. This is necessary in order to prevent a voltage drop in the connection which would cause heating and also tend to reduce the amount of current flowing through the machining gap. At the same time, it is desirable to permit rapid interchange of tools so that short-run jobs may be handled efficiently and profitably.

It is, therefore, an object of the present invention to provide a new quick-change tool system which permits the rapid interchange of tools in electro-erosion machines while providing a large area of contact between the tool and the electrically conductive element of the machine to which it is secured.

It is a further object of the invention to provide a quick-change tool system in which a positive, fluid-tight seal is provided between the tool and its support when the tool is inserted therein to permit machining fluid to be supplied to the tool while preventing corrosion of the tool - support interface due to flow of fluid therebetween.

Other objects and advantages of the present invention will become apparent by reference to the following specification taken in conjunction with the accompanying drawings which form a part thereof. It is to be understood, of course, that modifications may be made therein which are within the scope of the appended claims without departing from or exceeding the spirit of the invention.

DESCRIPTION OF THE INVENTION

FIG. 1 is a sectional elevation of a quick-change tooling system incorporating the present invention.

FIG. 2 is a partial view of the apparatus of FIG. 1 as viewed from the direction indicated by arrow 2 in FIG. 1.

FIG. 3 is a cross-sectional view taken along the lines 3—3 of FIG. 1.

FIG. 4 is an enlarged, partial cross-sectional view taken along the line 4—4 in FIG. 1.

In the present drawings there is shown a quick-change tool system which will permit the rapid interchange of different tools so as to enable efficient machining of various shapes and sizes of cavities in the workpieces to be machined. In the system herein shown, a platen 31 is adapted for enabling quick removal and insertion of an electrical machining tool 22. The platen 31 is carried by the head of the machine and is provided with a fluid inlet 41 through which machining fluid may be pumped into the tool and a fluid outlet 27 through which the fluid may flow from the tool back to the reservoir. The platen 31 is formed with a clamp portion 75 surrounding a cavity 76 in which is inserted the mounting portion 30 of the tool 22. Although the cavity 76 is shown as circular, in electro-erosive machining the tool is not usually rotated so that irregular and non-circular shapes can readily be machined. When machining such shapes, it is necessary to orient the tool with respect to the workpiece 20. This can easily be done by providing a key (not shown) in the cavity 76 or by machining the cavity to a shape which is other than circular.

The tool 22 is provided with a shoulder 77 which provides a positive location of the tool in the cavity when inserted therein as shown in FIG. 1. Nut and bolt arrangements 79 are provided for clamping the tool and holding it in place within the cavity 76. The clamp portion 75 is formed by slots 80 and 81 cut in the platen 31. The slot 80 extends parallel to the direction of insertion of the mounting portion 30 of the tool and extends radially outward from the cavity 76. The slot 81 extends perpendicular to the direction of insertion of the tool and, together with the slot 80, defines an arm 87 which may be clamped about the mounting portion 30 of the tool to hold it in its inserted position. To form the cavity 76, the bolts 79 are tightened with a thin spacer (not shown) in the slot 80. The cavity is then machined to the dimensions of the mounting portion 30 of the tool. Thus, in operation, the clamp arm 87 is biased outwardly to automatically release the tool 22 when the bolts 79 are loosened.

As shown in FIGS. 1 and 4, an annular groove 83 is formed in the bottom of the cavity 76. The groove 83 is in direct communication with the fluid inlet 41 in the platen 31. Fluid conduits 47 in the tool mounting portion 30 interconnect the space 53 in the tool with the groove 83 when the tool is inserted in the cavity 76. Seals 85 are provided to assure a fluid-tight connection between the groove 83 and the conduits 47. This is necessary to prevent machining fluid from corroding the interface between the clamp portion 75 and the mounting portion 30 which would destroy the positive electrical contact at the interface which is essential to the machining process.

An exhaust passage 33 in the tool 22 is in direct communication with the fluid outlet 27 in the platen 31. A seal 86 is provided between the passage 33 and the outlet 27 so as again to insure a fluid-tight connection.

At the conclusion of a machining operation, the head of the machine is elevated, the power is turned off, and the flow of machining fluid is stopped. A means (not shown) is provided to inject a blast of air through the inlet 41 and the outlet 27 to remove the remaining fluid. The bolts 79 are loosened thereby releasing the tool 22 from the clamp 75. A different tool having a mounting portion corresponding to the portion 30 of the tool 22 may then be inserted in the cavity 76 until the shoulder 77 contacts the clamp 75. The bolts 79 are then tightened and machining with the new tool in place is then begun.

The quick-change tool system hereinbefore described may also be advantageously used in connection with automatic tool changing systems. This can easily be accomplished by providing a hydraulic clamp in place of the nut and bolt arrangements 79. The apparatus needed for the automatic changing of tools is well-known in the art of metal removing machines.

While the invention has been described in connection with the specific embodiment shown, it is to be understood that the present disclosure is illustrative rather than restrictive and that changes and modifications may be made without departing from the spirit of the invention or the scope of the claims which follow.

What is claimed is:

1. A quick-change tool holder for an electro-erosive machine having an electrically conductive platen thereon for supporting a tool having a mounting portion and a machining portion, said holder comprising a chuck formed integrally with said platen and having a cavity formed therein for receiving the mounting portion of said tool, and a clamping arm on said chuck defined by a slot passing through the wall of said chuck and extending parallel to the longitudinal axis of the cavity, and a second slot perpendicular to the longitudinal axis of the cavity and intersecting with and defining one end of said first slot, the bottom of said second slot coinciding with the aforesaid end of said first slot and extending radially of the axis of said cavity to the opposite side of said chuck.

2. The tool holder of claim 1 including clamping means acting between said clamping arm and the body portion of said chuck in a direction perpendicular to said first slot for closing the clamping arm on a tool inserted in said cavity.

3. A quick-change tool system for an electro-erosive machine for machining a cavity in a workpiece with a tool having a mounting portion with a fluid conduit therein, said system comprising an electrically conductive platen having a fluid channel therein, a cavity in said platen for receiving the tool therein to an inserted position in which said channel communicates with the fluid conduit in the tool, an arm extending around a portion of said cavity, said arm being biased outwardly therefrom, means for clamping said arm around said tool with the mounting portion thereof inserted in said cavity to hold the tool in its inserted position, and means for effecting a fluid-tight seal between the tool and the platen in the area adjoining the conduit and the channel when said tool is held in its inserted position in the platen.

4. The quick-change tool system of claim 3 wherein the tool is provided with a plurality of fluid conduits therein and said platen is provided with a plurality of fluid channels arranged for communication with the conduits in the tool, and wherein seal means is provided between the tool and the platen to effect a fluid-tight connection between the channels and conduits when the tool is held in its inserted position in the platen.

* * * * *